(12) United States Patent
Hayden et al.

(10) Patent No.: US 7,740,774 B2
(45) Date of Patent: Jun. 22, 2010

(54) RESONANTLY ENHANCED PHOTOSENSITIVITY

(75) Inventors: Joseph S. Hayden, Clarks Summit, PA (US); Bianca Schreder, Frankfurt am Main (DE); Jose Zimmer, Ingelheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/880,942

(22) Filed: Jul. 24, 2007

(65) Prior Publication Data

US 2007/0267605 A1 Nov. 22, 2007

Related U.S. Application Data

(63) Continuation of application No. 10/357,829, filed on Jun. 23, 2003, now abandoned.

(51) Int. Cl.
*G02B 1/00* (2006.01)
*G03G 5/00* (2006.01)

(52) U.S. Cl. .......................... 252/584; 252/588; 65/390; 430/135

(58) Field of Classification Search ................. 252/584, 252/588; 65/390; 430/135
See application file for complete search history.

(56) References Cited

U.S. PATENT DOCUMENTS 4,769,310 A * 9/1988 Gugger et al. .............. 430/346
6,160,944 A * 12/2000 Payne et al. ................. 385/129
6,228,787 B1 5/2001 Pavel
6,573,026 B1 * 6/2003 Aitken et al. ............... 430/290
2003/0020044 A1 * 1/2003 Lyons et al. ............. 252/301.5
2003/0039459 A1 * 2/2003 Brambilla et al. ........... 385/132
2004/0105163 A1 * 6/2004 Bryan et al. ................ 359/652

FOREIGN PATENT DOCUMENTS

GB 2 210 873 A 6/1989

OTHER PUBLICATIONS

"Laser Induced Photochromic Effect in Tb3+-doped silica fibres", Electronic Letters, Nov. 10, 1994, vol. 30, No. 23, pp. 1970-1971.
"Photosensitivity of Sol-Gel Derived Aluminosilicate Planar Waveguides Doped with Ce3+ Ions", Journal of Sol-Gel Science and Technology 20, 287-292, 2001, V6181, pp. 287-292 published Jun. 3, 2001.
XP-002298360, Abstract from Photosensitivity studies of SM<2>/SM<3> doped aluminosilicate fiber dated Sep. 28, 2004 (One page).

* cited by examiner

*Primary Examiner*—Timothy J. Kugel

(57) ABSTRACT

A resonant enhanced photosensitive material includes a trap center that is adapted to interact with light and enhances the photosensitivity of the material based on a resonant interaction process with photons. The invention provides enhanced photosensitivity materials and, especially a method for enhancing photosensitivity in glasses, glass ceramics and ceramics.

19 Claims, 3 Drawing Sheets

RESONANTLY ENHANCED PHOTOSENSITIVITY

CROSS-REFERENCE TO RELATED APPLICATIONS

This is a Continuation Application for U.S. patent application Ser No. 10/357,829, filed on Jun. 23, 2003, now abandoned.

STATEMENT REGARDING FEDERALLY SPONSORED RESEARCH OR DEVELOPMENT

Not applicable.

BACKGROUND OF THE INVENTION

The invention concerns photosensitive materials in general and especially glasses, glass ceramics and ceramic materials wherein photonic processes are assisting or generating effects which cause changes of physical properties of the materials.

FIELD OF THE INVENTION

Description of Related Art

Photosensitive materials are widely known and used in an increasing number of different technical and scientific fields. Very recent developments in the optical communication industry have drawn a special interest of the scientific community to the interaction of light with glass or similar materials. However, such interaction requires huge light intensities which often only could be achieved in cost consuming experimental arrangements. In addition, to reduce processing costs and to transfer these concepts to a production or mass production oriented scale and respective manufacturing lines photosensitivity of these materials is of severe interest.

BRIEF SUMMARY OF THE INVENTION

It is an object of the invention to provide enhanced photosensitivity materials and, especially a method for enhancing photosensitivity in glasses, glass ceramics and ceramics.

According to the invention a resonant enhanced photosensitive material is obtained which comprises
a trap center which is adapted to interact with light and enhances the photosensitivity of the material based on a resonant interaction process with photons.

In a preferred embodiment said interaction with light is including a resonant multiphoton process, especially a resonant multiphoton absorption process.

Preferred trap centers comprise at least a member of the group consisting of dopants, preferably multivalent dopants, imperfections, structural artifacts, defects of bonds, lattice vacancies in ordered areas of the material, lattice defects in crystalline or quasi-crystalline areas of the material enhancing the photosensitivity of the material.

Most preferred trap centers comprise a dopant which is a multivalent dopant enhancing the photosensitivity of the material, especially a member of the group consisting of rare earth cations, Ce, Eu, Er, Nd, Tm, Ho, Pr, Sm, Yb and mixtures thereof.

Further multivalent dopants are Sb, As, Sn, Pb, Ti, Cr and Ni.

For the sake of clarity it expressly is stated that mentioning of Ce, Eu, Tm, Ho, Nb, Pr, Sm, Er, Dy, Tb, Sb, As, Sn, Pb, Ti, Cr and Ni in the specification as well as in the claims includes also any ions of these elements.

Preferably, the inventive enhancement of photosensitivity is assisted by an intraband trap center in the material which provides an electronic energetic state above the ground state which can be occupied by electrons in the course of a photonic absorption process.

In the most preferred embodiment said photonic absorption is a multiphoton absorption process assisting in a transition of an electron from a ground state to an energetic intraband state and wherein a further photonic absorption assists in a transition from the electronic intraband state to the conduction band.

Preferred photosensitive materials are glasses, glass ceramics and glass ceramic materials as well as ceramics and ceramic materials.

According to the invention a method of enhancing photosensitivity in a photosensitive material is obtained comprising introducing of dopants into said material, wherein said dopants provide real electronic states with an energy above the ground state and said energy of said real electronic states is a multiple n of the energy of individual photons in the light beam used to create the photosensitivity effect where n is an integer with n>1.

A most preferred method of enhancing photosensitivity uses as dopants a polyvalent species which generates within the composition of said resonant enhanced material stable electron-hole traps.

BRIEF DESCRIPTION OF THE SEVERAL VIEWS OF THE DRAWINGS

Reference is made in the more detailed description of the preferred and most preferred embodiments below to the appended drawings in which:

FIG. 1 schematically shows the impact of introducing a real state that offers a resonant enhancement of the multiphoton transition process;

DETAILED DESCRIPTION OF THE INVENTION

Figure 1A:
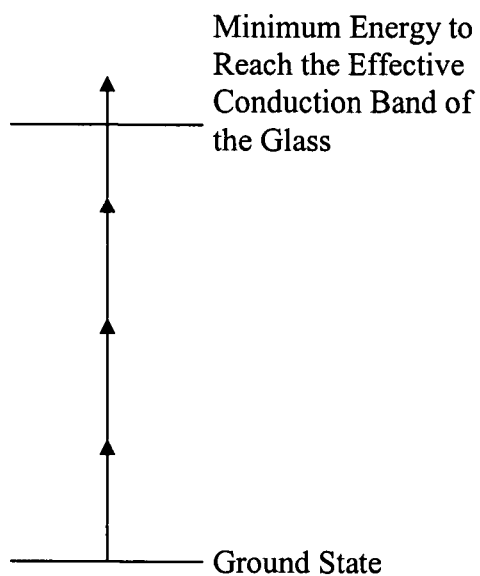
FIG. 1(a) schematically shows a nonresonant four photon transition.

The invention relates to photosensitive materials, i.e. materials interacting with light or in more detail interacting with photons of the light entering into the material itself.

In the course of the below-standing detailed description of the invention a definition of photosensitivity is given defining photosensitivity in a relative manner. According to this definition a material is more photosensitive or has an enhanced photosensitivity if for a certain effect which is based on an interaction with light or with photons less light or photons are necessary for the same strength or amount of the effect. Vice versa a material is less photosensitive if for said certain effect based on said interaction with light or with photons more light or more photons are necessary for the same strength or amount of the effect.

In the light of this before-standing definition a preferred physical effect is a change of the absorption, especially bleaching of a spectral absorption band or interval of the enhanced photosensitive material. A further most preferred physical effect is a change of the refractive index of the enhanced photosensitive material.

Especially for the above-mentioned physical effects, a very important class of materials are glasses, specifically photosensitive glasses, having certain physical properties that can be influenced or altered by means of photons propagating within the glass itself.

Glass is normally described as an insulator.

Electrons in the glass are all confined to orbitals about various atoms in the glass, or participate in covalent bonds that make up the glass structure. These electrons are not available to conduct electricity by their motion through the glass, and are described as existing in the valence band of the glass.

In conventional transparent glass, there are no excited electronic states in the glass accessible by a single visible photon induced transition.

Colored glass, on the other hand, has real excited states for electrons that lie at energies above the ground state that are accessible by visible photons (wavelengths greater than 390 nm and less than 770 nm).

Photosensitivity of conventional transparent glass to light beams in the visible to near-IR wavelengths, for example at 800 nm, is thus not expected. This is because conventional glass is transparent to light at visible to near-IR wavelengths. The energy of a single photon, roughly 1.55 eV for 800 nm wavelength light, is not absorbed in conventional transparent glass. Nevertheless, photosensitivity of glass exposed to photons at which the glass is transparent has been reported by many researchers.

The inventors of the present invention are convinced that photosensitivity is due to interaction of conventional transparent glass with more than one photon simultaneously. In this way, the energy of several photons is combined to result in a measurable effect on glass properties.

In more concrete, the inventors of the present invention assume photosensitivity involves the absorption by electrons in the glass of more than one photon simultaneously. These excited electrons become sufficiently excited that they become delocalized from the parent atom or bond, and can take on new energy states within the glass.

A portion of the excited electrons can return to the initial, ground energy state within the glass, but at least a portion of the excited electrons can become located in stable states with the glass.

These stable states are called electron traps. For every stable electron trap, there is a corresponding stable hole trap that represents the absence of an electron from the initial ground state.

These new stable states, or trapped electron-hole pairs, introduce to the glass new properties.

These new properties can, for example, include absorption bands with associated discoloration of the glass, often referred to as a "solarization" as well as a change in the refractive index.

The refractive index change occurs because refractive index is determined by combined polarizability of all electrons within the glass, and each electron state has a different polarizability.

Altering the electronic state distribution in glass thus causes a corresponding change in the refractive index.

The inventors of the present invention believe that there is a minimum energy required for stable electron-hole pairs to be generated. Specifically, the energy represents excitation of electrons to the effective conduction band of the glass.

The effective conduction band can be estimated from observing the transmission curve of the glass. Typically, glass is opaque and absorbs all light at wavelengths shorter than a particular value, typically in the range of 380 nm down to 360 nm. The corresponding energies to be exceeded for photosensitivity to occur are 3.26 to 3.44 eV.

In the case of 800 nm light, with energy of 1.55 eV, it requires the simultaneous interaction with three photons (total energy 4.65 eV) to exceed the total energy of 3.26 eV to 3.44 eV.

Such a three photon interaction is called a nonresonant three photon transition. It is termed as a nonresonant transition because these is no real intermediate state that lies 1.55 eV or 2×1.55=3.10 eV (corresponding to absorption bands at 800 nm and 400 nm) above the ground state of the glass for the electron to reside in prior to absorbing the next photon.

The simultaneous nonresonant interaction of a single electron with more than one photon is a highly unlikely event. Normally, electron transitions occur only between two real electronic states separated in energy by exactly the energy of the exciting photons. However, the high photon flux made available with a pulsed laser system allows a sufficient number of these unlikely transitions to occur and there are consequently observable changes in macroscopic properties such as refractive index.

Let us consider the Hurricane X laser from Spectra-Physics. This laser delivers more than 0.75 mJ of 800 nm light confined in a pulse length of only 140 fsec. There are 3.0× $10^{18}$ photons in a single pulse from such a laser. So, even when the probability of a three photon nonresonant transition is one in a million (1 in $10^{12}$) events, there are still a million ($10^6$) nonresonant transitions taking place, resulting in the measurable effects. This is why photosensitivity is observed in glass that is transparent at the wavelength of the exposure laser beam.

The inventors of the present invention now introduce the concept of a resonant three photon transition. Here, there is a real state for the electron at an energy equal to some integer multiple of the individual photon energy in the laser beam. If the resonant state lies at one times the individual photon energy, a visible absorption band is present in the glass at the exposure wavelength. However, if the real state lies at a multiple of the photon energy in the laser beam, the glass can remain transparent to the energy of the exposure light, but the resonant effect will still result.

For example, if the real state exists at 3.10 eV, there is a real state at twice the energy of the individual photons in a laser beam with a wavelength of 800 nm. The glass continues to be transparent at 800 nm, and in fact is transparent all the way from 800 nm down to nearly 400 nm. However, whereas previously to reach the effective conduction band required a total of three photons combining in three nonresonant transitions, now only two nonresonant transitions are required to reach the effective conduction band of the glass. Such a three photon interaction that includes the action of one or more real states is called a resonantly enhanced three photon transition.

The argument presented here is not restricted to three photon events. The same principles apply in any multiphoton transition process. The impact of introducing a real state that offers a resonant enhancement of the multiphoton transition process is shown schematically in FIG. 1.

Figure 1B:
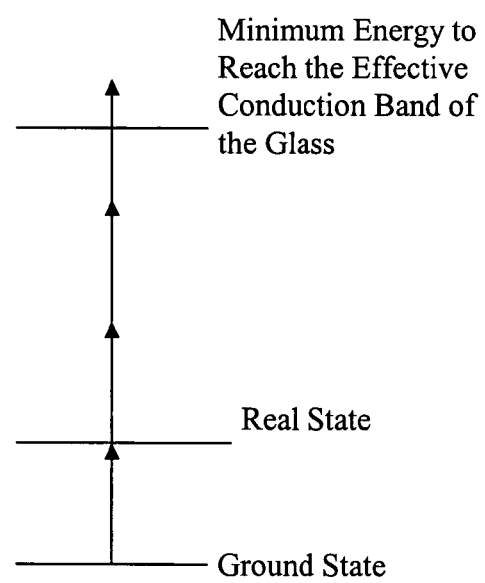
FIG. 1(b) schematically shows a resonantly enhanced four photon transition where the real state corresponds to a energy value above the ground state equal to the individual photon energy of the laser beam.

FIG. 1(a) schematically shows a nonresonant four photon transition. FIG. 1(b) schematically shows a resonantly enhanced four photon transition where the real state corresponds to a energy value above the ground state equal to the individual photon energy of the laser beam.

Figure 1C:
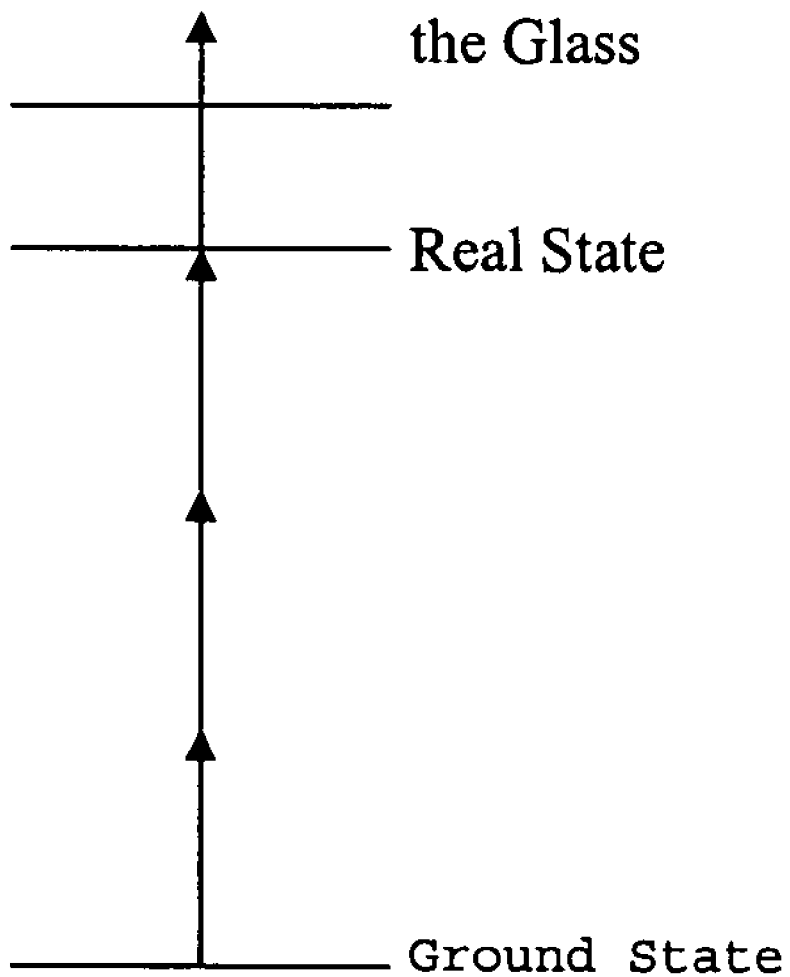
FIG. 1(c) schematically shows a resonantly enhanced four photon transition where the real state is twice the energy of individual photons in the laser beam.

In this case, the glass is not transparent to the excitation light beam but the resonant enhancement still exists. FIG. 1(c) schematically shows a resonantly enhanced four photon transition where the real state is twice the energy of individual photons in the laser beam. In this case the glass is transparent to the excitation light beam and the resonant enhancement effect is realized.

Figure 2:
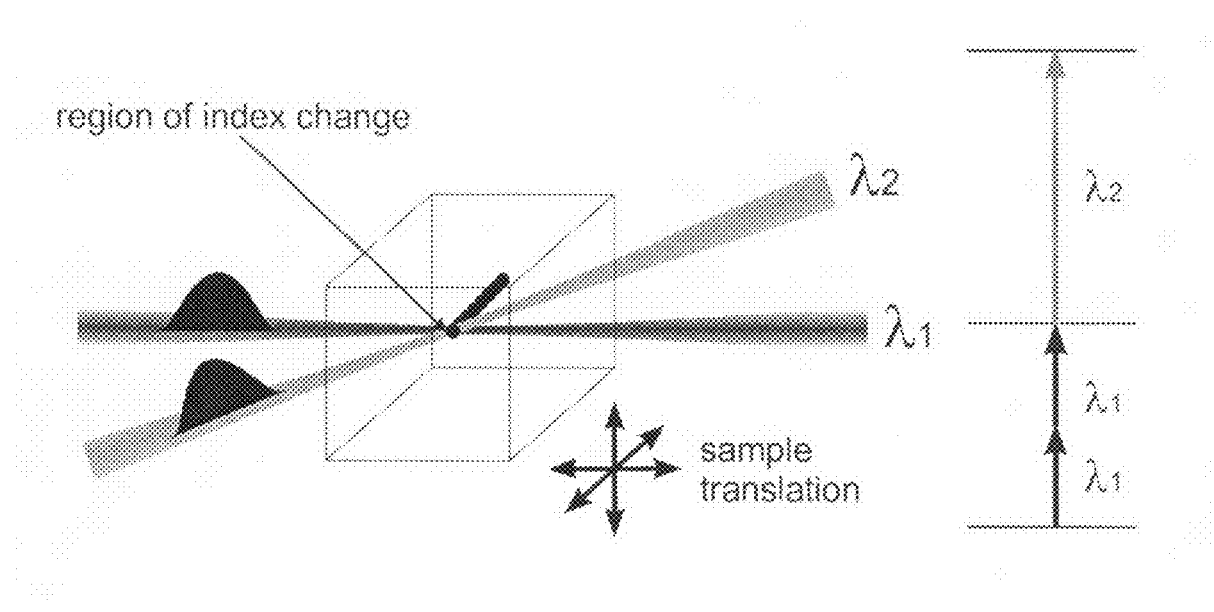
FIG. 2 schematically shows a resonantly enhanced three photon transition where the real state is twice the energy of the first laser photons and the second transition is resonant to the second laser photon.

A person skilled in the art may use a so-called "two resonance" excitation process, which utilizes two laser wavelengths, where the shorter wavelength is a two photon resonance to the real intermediate state and the second longer laser wavelength is then resonant to the transition from the intermediate state to the final state. Someone skilled in the art will adjust temporal and spatial coherence/overlap of both pulses in a way, that ideal conditions for the transition are ensured (FIG. 2).

The reason for the remarkable enhancement of the multiphoton process was first derived mathematically by Maria Goeppert-Mayer in 1931 (See Ann. Phys. Vol. 9 (1931) 273). Although first derived in 1931, this process has not been applied to transitions within optical materials such as glass and has not been applied to enhance photosensitivity in glass. Lets consider here only the mathematical description of a two photon resonant enhancement.

The rate, R, for a single photon transition between two real states, denoted as $<\Box_f|$ and $|\Box_I>$ is given mathematically by a matrix element written as:

$$R_{1P} = |<\Box_f|M_{op}|\Box_I>|^2.$$

where $M_{op}$ is termed as an operator that acts on the electron in the real initial state $|\Box_I>$ that results in the electron being excited into the real final state $<\Box_f|$.

In a two photon nonresonant process, the analogous expression is:

$$R_{2P} = |\Sigma\{<\Box_f|M_{op}|\Box_i><\Box_i|M_{op}|\Box_I>\}/\{E_i-E\}|^2$$

where $|\Box_i>$ represent intermediate real states that lie either above or below the energy level of the final state $<\Box_f|$; $E_i$ is the energy level of the $|\Box_i>$ intermediate state and E is the energy of the photons in the laser beam inducing the two photon nonresonant transition; and the sum, $\Sigma$, is taken over all intermediate states $|\Box_i>$ in the system.

In a non-resonant two photon process, all available $|\Box_i>$ have energy levels, $E_i$, far from the excitation light source at energy E. The denominator in the expression for $R_{2P}$ is large, and the value for $R_{2P}$ is correspondingly low.

In the case of a resonant, two photon transition, a real state exists in the glass at energy $E_i$ close, or identical to, the photon energy E, making the denominator in the expression for the two photon transition rate, $R_{2P}$, small and the corresponding two photon transition rate, $R_{2P}$, to become large. Note that effectively for $E_i=E$, the denominator goes to zero and the transition rate $R_{2P}$ goes to infinity.

The addition of a real state to create the resonant enhancement effect increases the transition rate for electrons to reach the effective conduction band a glass and enhances the photosensitivity effect. The resonant enhancement of photosensitivity is not limited to glasses, but can occur in any material.

Introducing a real state in glass can be accomplished any number of ways.

Transition metal ions Sc to Cu, Y to Ag, Hf to Au in glass introduce broad absorption bands, corresponding to broad ranges of allowed excited electron energies, are one example. A preferred method is through the use of rare earth cations added to the glass.

Rare earth cations are preferred since the resultant absorption bands are sharp and well defined (corresponding to narrow ranges of allowed energies for the real excited electron states) and the glass is left completely transparent over large wavelength regions.

In the three photon transition example above, the real absorption band at nominally 3.10 eV (corresponding to a wavelength of 400 nm) can be accomplished by doping the glass with a small amount of cerium. At the same time, the cerium leaves the glass fully transparent at the exposure wavelength of 800 nm and at wavelength down to about 420 nm.

The cerium has an additional advantage that it is a polyvalent species in glass that can act as a stable trap for both electrons and holes via assuming different redox states within glass both of which have nearly identical optical absorption bands in the 400 nm region.

Further dopants and glasses are described in the application "Photostrukturierbarer Körper sowie Verfahren zur Bearbeitung eines Glases und/oder einer Glaskeramik", "Photostructurable Body as well as Method for Treatment of a Glass and/or a Glass Ceramic", filed in the name of Schott Glass, Mainz, Federal Republic of Germany, in the German Patent and Trademark Office on the same filing date as this application and which is completely incorporated here by reference.

In more general terms the invention teaches a resonant enhanced photosensitive material, which comprises adapted to interact with light and enhances the photosensitivity of the material based on a resonant interaction process with photons. This interaction with light is including a resonant multiphoton process as described in more detail above.

This multiphoton process is a resonant multiphoton intraband absorption process based on energetic levels in the material as essentially introduced by the above-mentioned trap centers.

These trap centers comprise at least a member of the group consisting of dopants, preferably multivalent dopants, imperfections, structural artifacts, defects of bonds, lattice vacancies in ordered areas of the material, lattice defects in crystalline or quasi-crystalline areas of the material enhancing the photosensitivity of the material.

According to the most preferred embodiment of the invention this dopant is a multivalent intraband dopant enhancing the photosensitivity of the material whereby a preferred multivalent dopant comprises a member of the group consisting of rare earth cations, Ce, Eu, Tm, Ho, Nb, Pr, Sm, Er, Dy, Tb, and mixtures thereof.

These dopants provide an electronic energetic state above the ground state and below the conduction band of the photosensitive material which can be occupied by electrons in the course of a photonic absorption process which is a multiphoton absorption process assisting in a transition of an electron from a ground state to an energetic intraband state and wherein a further photonic absorption assists in a transition from the electronic intraband state to the conduction band. Consequently, the two-step absorption process involves drastically less photons for each transition step and as a consequence thereof less intense light.

In more detail, said dopants provide real electronic states with an energy above the ground state of a multiple n of the energy of individual photons in the light beam used to create the photosensitivity effect where n is an integer with n>1.

For a transition from ground state to the conduction band an energy would be necessary of a multiple m of the energy of the individual photons in the light beam used to create the photosensitive effect with m being an integer and m>n. Consequently, the transition from the ground state to the electronic intraband state is much more likely than a transition from the ground state to the conduction band.

A remaining number of p photons is necessary for the transition from the intraband state to the conduction band with p being an integer and p=m−n which transition takes place as an p-photon multiphoton absorption process.

In a preferred embodiment of the invention a first laser light beam is directed into said material providing photons interacting with trap centers in said material and said first laser light beam comprises ultra violet light with photons that assist a direct transition from the ground state to the above-described intraband state.

In an alternative embodiment of the invention said first laser light beam is directed into said material providing photons interacting with trap centers in said material by means of a multiphoton absorption and said first laser light beam comprises fs laser light pulses having an intensity which allows for two- or three-photon multiphoton absorption to transfer a charge carrier, especially an electron, from the ground state to the intraband energy state.

In a most preferred embodiment a second laser light beam is directed into said material and interacts in an overlapping area within said photosensitive material within at least a portion of said first laser light beam. The wavelength of said first laser light beam is adapted to the energy of the transition from the energetic ground state to the energetic intraband state and the wavelength of said second laser light beam is adapted to the energy of the transition from the energetic intraband state to the conduction band. Said first and second laser light beams are adapted such that said first laser light beam increases the number of occupied intraband states and said second laser light beam increases the transitions from the intraband state to the conduction band. As a consequence thereof, optimized intensities and wavelengths can be introduced providing for an maximum energetic transfer rate at a minimized "light consumption" as said intensity of said first laser light beam is related to and optimized in view of the transition rate from the energetic ground state to the energetic intraband state and said intensity of said second laser light beam is related to and optimized in view of the transition rate from the energetic intraband state to the conduction band.

To that end, said second laser light beam typically has a wavelength and intensity which is different from a wavelength and intensity from said first laser light beam, respectively.

A confocal arrangement can be used wherein said first and said second laser light beam are focused in parallel into said material by means of the same lens to ensure a maximum overlapping area.

Alternatively, said first and said second laser light beam are focused in an oblique angle into said material if a spatial separation is of increase interest.

In the most preferred embodiment said resonant enhanced material comprises glass, glass ceramic, glass ceramic material, ceramic and ceramic materials.

According to the invention, the afore-mentioned terms "light" or "photons" are not restricted to the visible spectrum of electromagnetic waves. Significantly, every multiphoton process provides reduced wavelength photons having a wavelength that can be shorter than the ultraviolet part of the visible spectrum.

In addition, the invention is not restricted solely to photonic intraband effects, i.e. to effects including or being assisted by a photonic interaction with energy levels being only available within the energetic interval between a solid state bulk material ground state and a solid state bulk material conduction band. In a more general interpretation the term conduction band is according to the invention not restricted to solid state energy levels as found in highly ordered solid state bulk material but also includes energetic levels of similar ordered areas of a solidified melt as e.g. special crystalline phases or ordered phases in glasses, glass ceramics and ceramics.

In an even more generalized manner, the invention uses the term conduction band also for energetic levels of charge carriers within an insulating material which allow for a migration of these charge carriers after excitation to these energetic levels.

What is claimed is:

1. A method of enhancing photosensitivity in a photosensitive material, comprising:
   introducing of dopants into said material,
   said dopants providing real electronic states with an energy above the ground state,
   said energy of said real electronic states being a multiple n of the energy of individual photons in the light beam used to create the photosensitivity effect where n is an integer with n>1,
   directing a first laser light beam into said material and
   directing a second laser light beam into said material interacting in an overlapping area within said photosensitive material within at least a portion of said first laser light beam and
   generating a photonic interaction in said photosensitive material, wherein said interaction comprises a multiphoton absorption process,
   wherein a refractive index of said photosensitive material is changed based on said multiphoton assisted absorption process.

2. A method of generating photonic interaction in a photosensitive material, according to claim 1 comprising:
   directing a first laser light beam into said material,
   said first laser light beam providing photons interacting with trap centers in said material,
   said interaction assisting a transition from a ground state to an energetic intraband state.

3. A method of generating photonic interaction in a photosensitive material according to claim 2, wherein said first laser light beam comprises ultra violet light.

4. A method of generating photonic interaction in a photosensitive material according to claim 2, wherein said first laser light beam comprises ps laser light pulses.

5. Method of generating photonic interaction in a photosensitive material according to claim 2, wherein said material comprises a glass ceramic material.

6. Method of generating photonic interaction in a photosensitive material according to claim 2, wherein said material comprises a ceramic material.

7. A method of enhancing photosensitivity in a photosensitive material according to claim 1, wherein said dopants comprise a polyvalent species which generates within the composition of said photosensitive material stable electron-hole traps.

8. A method of enhancing photosensitivity in a photosensitive material according to claim 1, wherein said material comprises glass.

9. A method of enhancing photosensitivity in a photosensitive material according to claim 1, wherein said material comprises a glass ceramic material.

10. A method of enhancing photosensitivity in a photosensitive material according to claim 1, wherein said material comprises a ceramic material.

11. A method of enhancing photosensitivity in a photosensitive material according to claim 1, wherein the first laser light beam comprises fs laser light pulses.

12. A method of enhancing photosensitivity in a photosensitive material according to claim 1, wherein said second laser light beam has a wavelength which is different from a wavelength from said first laser light beam.

13. A method of enhancing photosensitivity in a photosensitive material according to claim 1, wherein said wavelength of said first laser light beam is adapted to the energy of the transition from an energetic ground state to an energetic intraband state.

14. A method of enhancing photosensitivity in a photosensitive material according to claim 1, wherein said wavelength of said second laser light beam is adapted to the energy of the transition from an energetic intraband state to a conduction band.

15. A method of enhancing photosensitivity in a photosensitive material according to claim 1, wherein said first and second laser light beams are adapted such that said first laser light beam increases the number of occupied intraband states and said second laser light beam increases the transitions from the intraband states to a conduction band.

16. A method of enhancing photosensitivity in a photosensitive material according to claim 1, wherein an intensity of said first laser light beam is related to the transition rate from an energetic ground state to an energetic intraband state.

17. A method of enhancing photosensitivity in a photosensitive material according to claim 1, wherein an intensity of said second laser light beam is related to the transition rate from an energetic intraband state to a conduction band.

18. A method of generating photonic interaction in a photosensitive material according to claim 1, wherein said first and said second laser light beam are focused in parallel into said material.

19. A method of enhancing photosensitivity in a photosensitive material according to claim 1, wherein said first and said second laser light beam are focused in an oblique angle into said material.

* * * * *